(12) United States Patent
Tseng et al.

(10) Patent No.: US 8,049,478 B2
(45) Date of Patent: Nov. 1, 2011

(54) SWITCHING REGULATOR AND METHOD FOR ELIMINATING BEAT OSCILLATION

(75) Inventors: Kuo-Lung Tseng, Taoyuan (TW); Wei-How Chan, Jhubei (TW); Chieh-Min Feng, Jhubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 99 days.

(21) Appl. No.: 12/587,161

(22) Filed: Oct. 2, 2009

(65) Prior Publication Data
US 2010/0156370 A1 Jun. 24, 2010

(30) Foreign Application Priority Data
Dec. 23, 2008 (TW) .............................. 97150292 A

(51) Int. Cl.
*G05F 1/00* (2006.01)
(52) U.S. Cl. ........................................ 323/282; 323/286
(58) Field of Classification Search .................. 323/222, 323/223, 271, 282, 283, 284, 285, 286
See application file for complete search history.

(56) References Cited

U.S. PATENT DOCUMENTS

| 3,986,100 | A  | * | 10/1976 | Beierholm et al. | 323/285 |
| 5,912,552 | A  | * | 6/1999  | Tateishi         | 323/285 |
| 6,320,733 | B1 | * | 11/2001 | Feldtkeller      | 361/87  |
| 2004/0189264 | A1 | * | 9/2004 | Matsuura et al. | 323/224 |
| 2005/0046401 | A1 | * | 3/2005 | Inn et al.      | 323/282 |
| 2008/0207155 | A1 | * | 8/2008 | Shimada et al.  | 455/307 |

* cited by examiner

*Primary Examiner* — Adolf Berhane
*Assistant Examiner* — Nguyen Tran
(74) *Attorney, Agent, or Firm* — Tung & Associates

(57) ABSTRACT

The present invention discloses a switching regulator eliminating beat oscillation, comprising: a first transistor, a second transistor, and an inductor connected to a common node, wherein the first and second transistors operate to convert an input voltage to an output voltage; a comparator comparing a voltage signal with a saw tooth wave to generate a control signal controlling at least one of the first and second transistors; a feedback loop obtaining a feedback signal from the output voltage and generating the voltage signal according to the feedback signal; and an inductorless filter circuit located in the feedback loop for filtering a predetermined frequency band.

11 Claims, 7 Drawing Sheets

SWITCHING REGULATOR AND METHOD FOR ELIMINATING BEAT OSCILLATION

BACKGROUND OF THE INVENTION

1. Field of Invention

The present invention relates to a switching regulator eliminating beat oscillation and a method for eliminating beat oscillation; particularly, it relates to a switching regulator eliminating beat oscillation and a method for eliminating beat oscillation by means of an inductorless filter.

2. Description of Related Art

There are many types of switching regulators, including buck converter, boost converter, inverter converter, and mixing types such as buck-boost converter and inverter-boost converter. By way of example, FIG. 1 shows a conventional buck switching regulator 1 which comprises two transistors Q1 and Q2; the gates of the transistors Q1 and Q2 are controlled by up-gate and low-gate signals UG and LG, respectively. The switching of the transistors Q1 and Q2 controls the current amount and direction on the inductor L, so that power is transmitted to the output OUT. The signals UG and LG are generated according to a feedback signal FB obtained from the output OUT, for example by a PWM (Pulse Width Modulation) controller 10 or a PFM (Pulse Frequency Modulation, not shown), etc. The feedback control mechanism is well known to those skilled in this art and therefore is not redundantly explained here. FIG. 2 and FIG. 3 show boost switching regulator 2 and inverter switching regulator 3, respectively.

Referring to FIG. 4, in a switching regulator (buck converter as an example), a PWM comparator (PWM) compares a voltage signal Vc with a saw tooth wave to generate the signals for controlling the transistors Q1 and Q2 (for simplicity in explaining the theory, only one PWM comparator is shown in the circuit in FIG. 4; in an actual circuit, the two transistors may not be controlled by the same PWM comparator). The saw tooth wave has a frequency fs, while the voltage signal Vc has a frequency fp. Referring to FIG. 5A-5C, when the voltage signal Vc carries a frequency fp, in the voltage Vd at the common node between the transistors Q1, Q2 and the inductor L, side bands (or called beat oscillation) will be generated at the frequencies −2fs+fp, −fp, −fs+fp, fs−fp, ..., that is, at the frequency mfs±fp (wherein m is an integer). Because the inductor L and the output capacitor provide low-pass filtering effect, most of the side bands in the output voltage Vo will be filtered out. However when the frequency fp is close to the frequency fs, the frequencies −fs+fp and fs−fp are low frequencies, which can not be filtered out. Instead, the beat oscillation still exists in the output voltage Vo, as shown in FIG. 5C.

The problem mentioned above will become more serious in multiphase switching regulators. Referring to FIG. 6, the first-phase buck switching regulator circuit generates current io1, and the second-phase buck switching regulator circuit generates current io2, constituting the total output current io. The beat oscillation results in a serious imbalance between the output currents io1 and io2 of the two phases as shown in FIG. 5D, and impacts the stability of the circuit.

In view of the foregoing, this invention proposes a switching regulator eliminating beat oscillation, and a method for controlling a switching regulator, to remedy the defects in the conventional technology.

SUMMARY OF THE INVENTION

The first objective of the present invention is to provide a switching regulator eliminating beat oscillation.

The second objective of the present invention is to provide a method to control the switching regulator.

In order to achieve the foregoing objectives, according to one perspective of the present invention, it provides a switching regulator eliminating beat oscillation, the switching regulator comprising: a first transistor, a second transistor, and an inductor connected to a common node, wherein the first and second transistors operate to convert an input voltage to an output voltage; a comparator, comparing a voltage signal with a saw tooth wave to generate a control signal controlling at least one of the first and second transistors; a feedback loop obtaining a feedback signal from the output voltage and generating the voltage signal according to the feedback signal; and an inductorless filter circuit located in the loop for filtering a predetermined frequency band.

According to another perspective of the present invention, it provides a method for eliminating beat oscillation in a switching regulator, comprising the following steps: providing a switching regulator, the switching regulator including a first transistor, a second transistor, and an inductor, connected to a common node; operating the first and second transistors to convert an input voltage to an output voltage; obtaining a feedback signal from the output voltage, and generating a voltage signal according to the feedback signal; comparing the voltage signal with a saw tooth wave to generate a control signal controlling at least one of the first and second transistors; and filtering a predetermined frequency band without an inductor during the process of obtaining the feedback signal from the output voltage and generating the voltage signal according to the feedback signal.

In the circuit and method mentioned above, the predetermined frequency band preferably includes frequencies in the vicinity of a frequency of the saw tooth wave.

The inductorless filter circuit and the step of filtering a predetermined frequency band without an inductor may employ an inductor equivalent circuit, or a combination of high-pass and low-pass filter circuits.

The objectives, technical details, features, and effects of the present invention will be better understood with regard to the detailed description of the embodiments below, with reference to the drawings.

DESCRIPTION OF THE PREFERRED EMBODIMENTS

Figure 1:
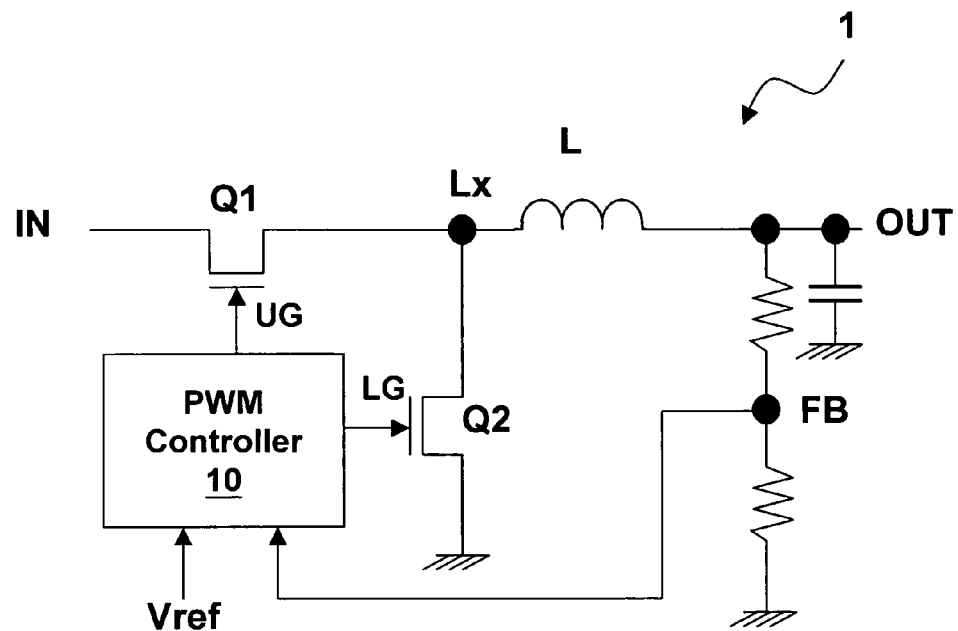
FIG. 1 is a schematic circuit diagram of a prior art buck switching regulator.
Figure 2:
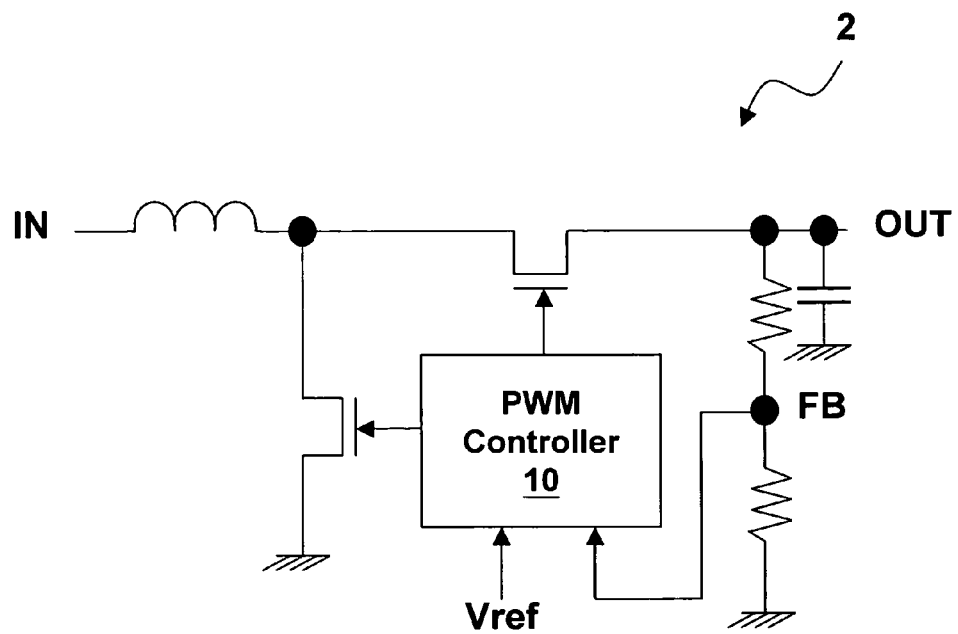
FIG. 2 is a schematic circuit diagram of a prior art boost switching regulator.
Figure 3:
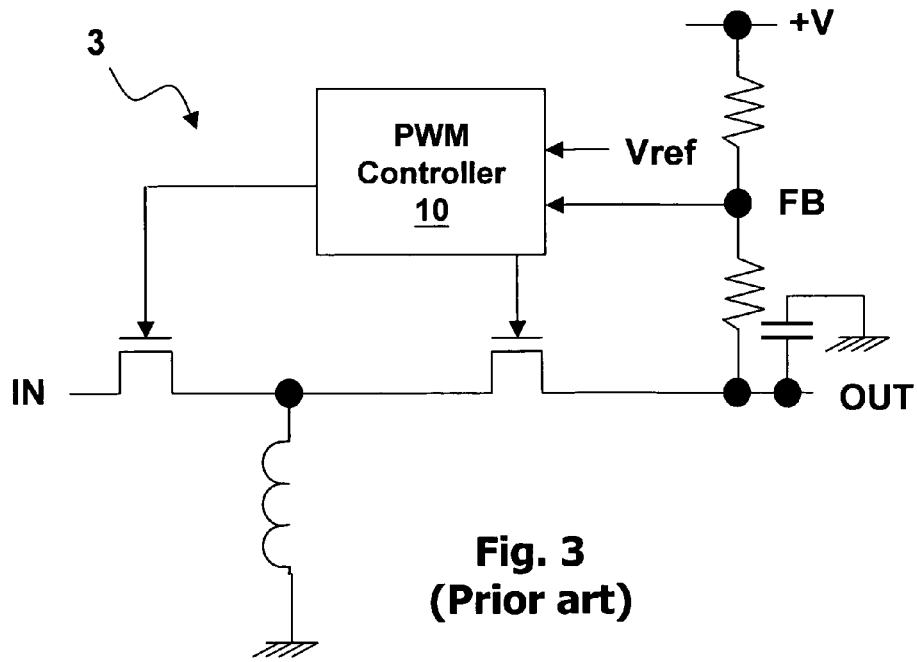
FIG. 3 is a schematic circuit diagram of a prior art inverter switching regulator.
Figure 4:
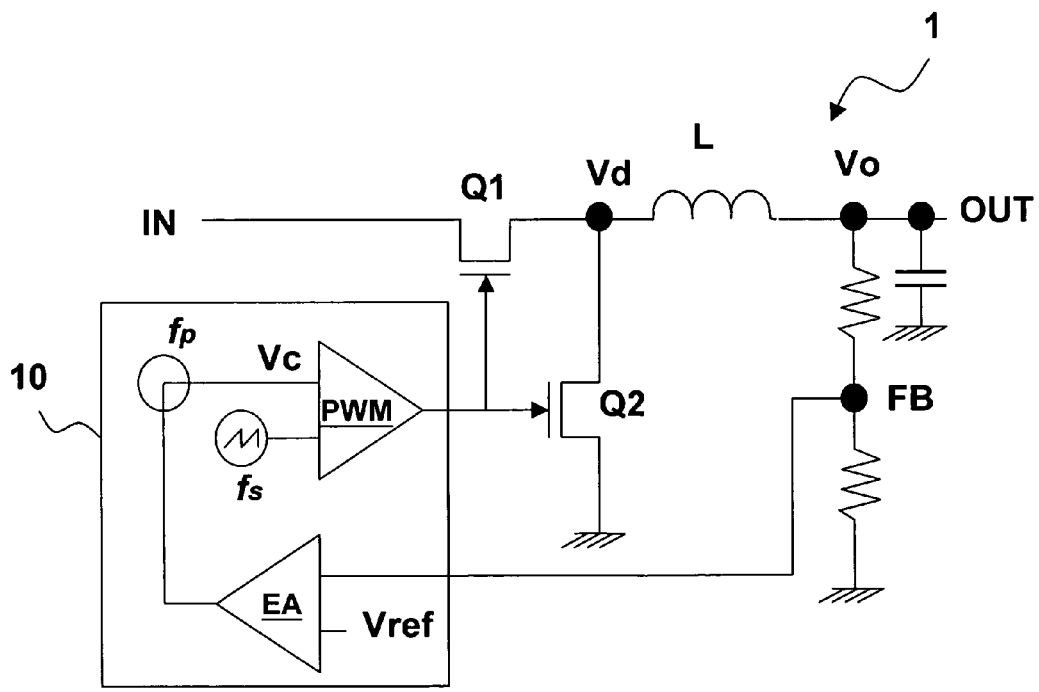
FIG. 4 explains the problem in prior art, using a conventional buck switching regulator as an example.
Figure 5A:
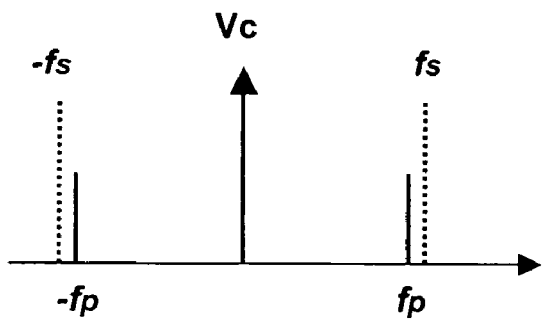
FIGS. 5A-5C explain why beat oscillation is generated.
Figure 5B:
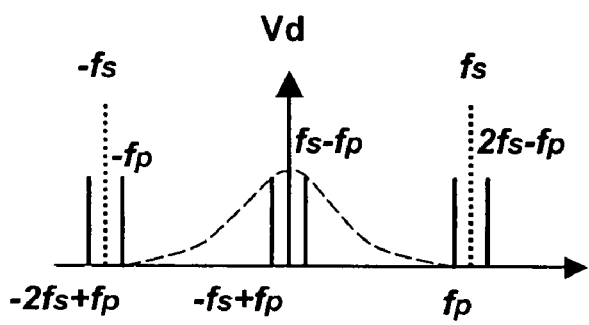
Figure 5C:
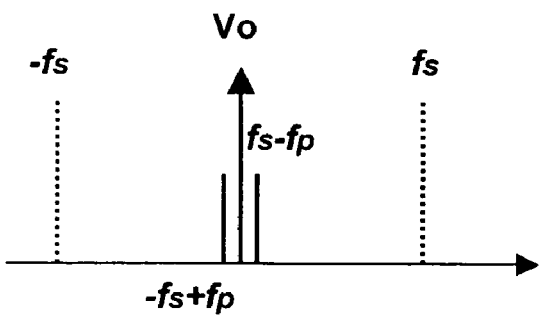
Figure 5D:
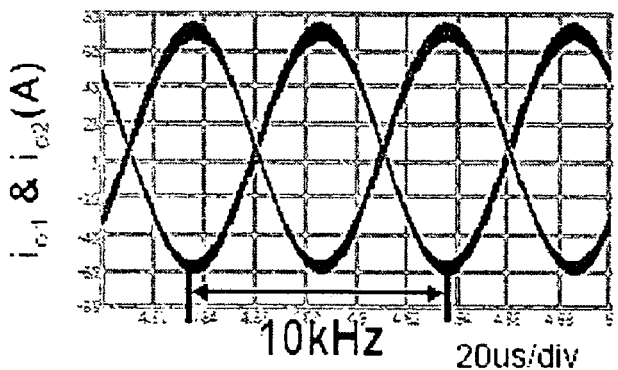
FIG. 5D shows the serious current imbalance caused by the beat oscillation in the multiphase switching regulator.
Figure 6:
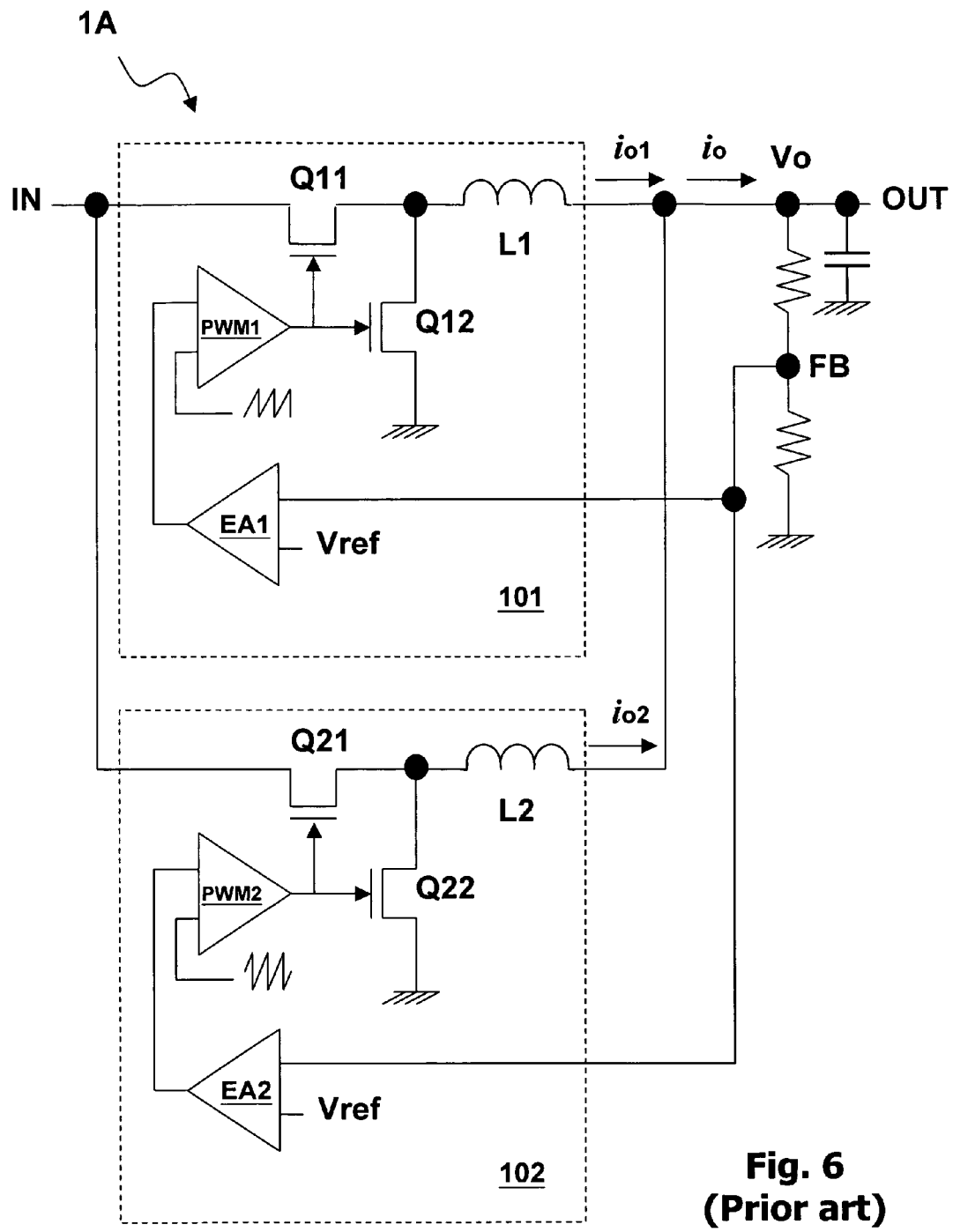
FIG. 6 shows a schematic circuit diagram of a multiphase buck switching regulator.
Figure 7:
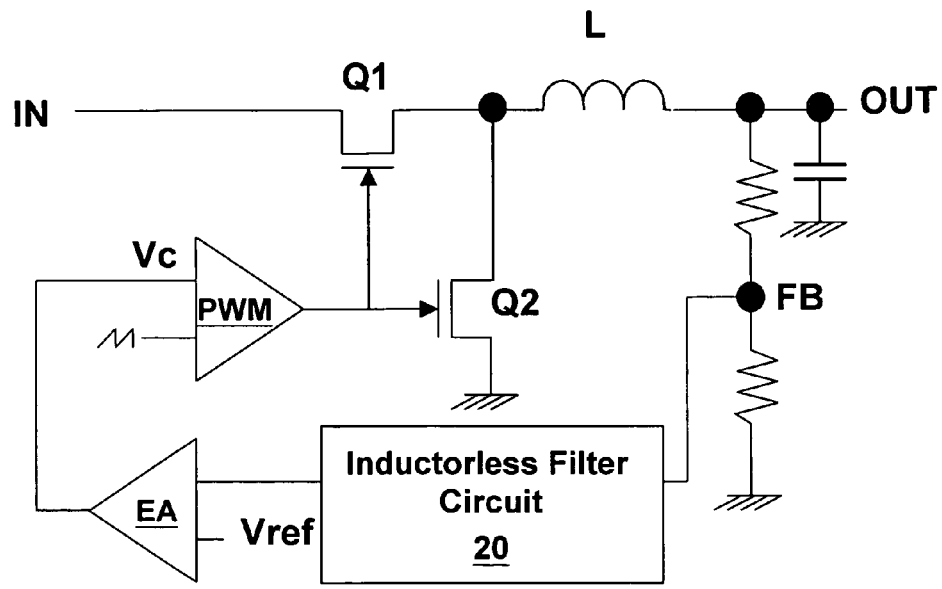
FIG. 7 and FIG. 8 show two buck switching regulator embodiments of the present invention.
Figure 8:
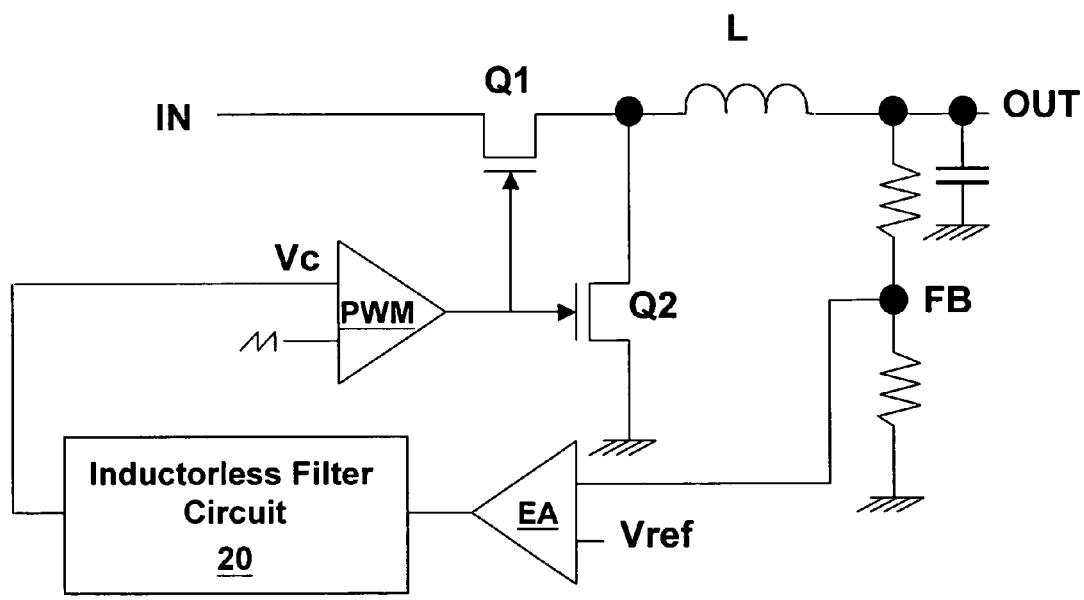

The main concept of this invention is to provide a filter circuit to filter the frequency band in the vicinity of the frequency fs, such that the voltage signal Vc does not carry any side band closing to the frequency fs. In addition, this filter circuit preferably does not include an inductor, in order to facilitate circuit integration. Please refer to, FIG. 7 and FIG. 8 wherein the present invention is applied to a buck switching regulator for example. The present invention provides an inductorless filter circuit 20, which can be located anywhere in the close loop between the output voltage Vo and the PWM comparator, such as but not limited to the positions shown in FIG. 7 and FIG. 8.

Figure 9:
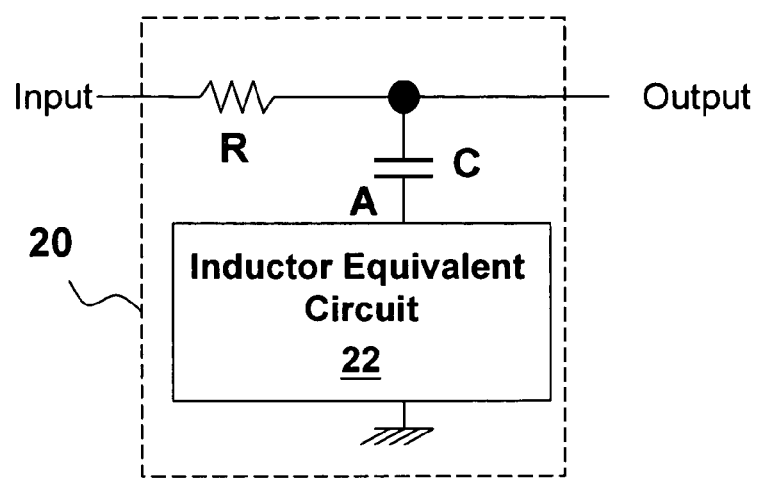
FIG. 9 and FIG. 10 show one embodiment of an inductorless filter circuit of the present invention.

One embodiment of the inductorless filter circuit 20 is shown in FIG. 9. In this embodiment, a resistor R, a capacitor C, and an inductor equivalent circuit 22 constitute a notch filter; by proper design of its filtered band, beat oscillation can be eliminated.

Figure 10:
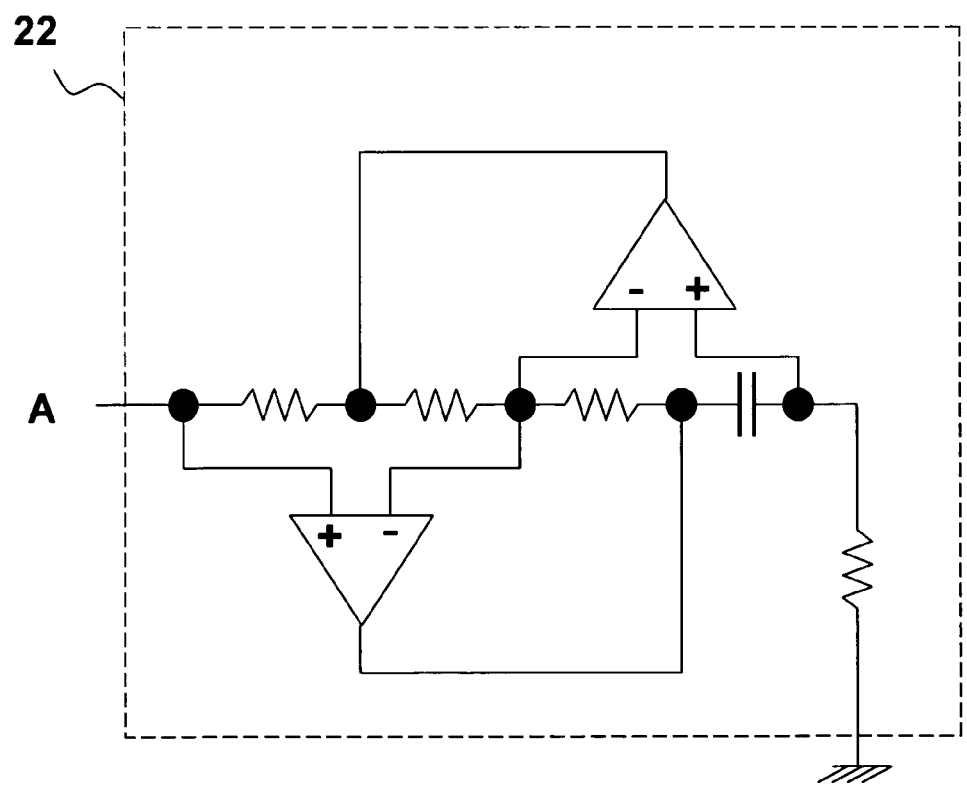

The inductor equivalent circuit 22 is a circuit which can provide the same functionality as an inductor but is not an inductor itself. One embodiment thereof is shown in FIG. 10.

Figure 11:
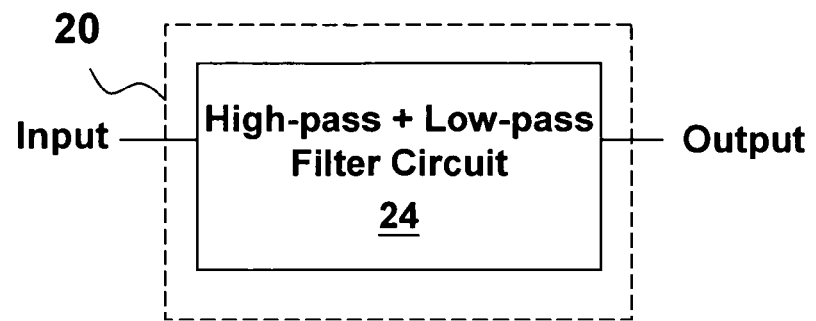
FIG. 11 and FIG. 12 show another embodiment of an inductorless filter circuit of the present invention.

As another example, the inductorless filter circuit 20 can be embodied as shown in FIG. 11. Since the purpose of the inductorless filter circuit 20 is to filter a predetermined frequency band, the inductorless filter circuit 20 can be constructed by a combination of a high-pass filter and a low-pass filter (the high-pass+low-pass filter circuit 24, for example). The High-pass filter and low-pass filter can be connected in series, in parallel, or in any other combinational way, and the order of the high-pass or low-pass filter can be any number greater than or equal to 1. The higher the order, the closer it is to a notch filter with respect to its frequency response pattern.

Figure 12:
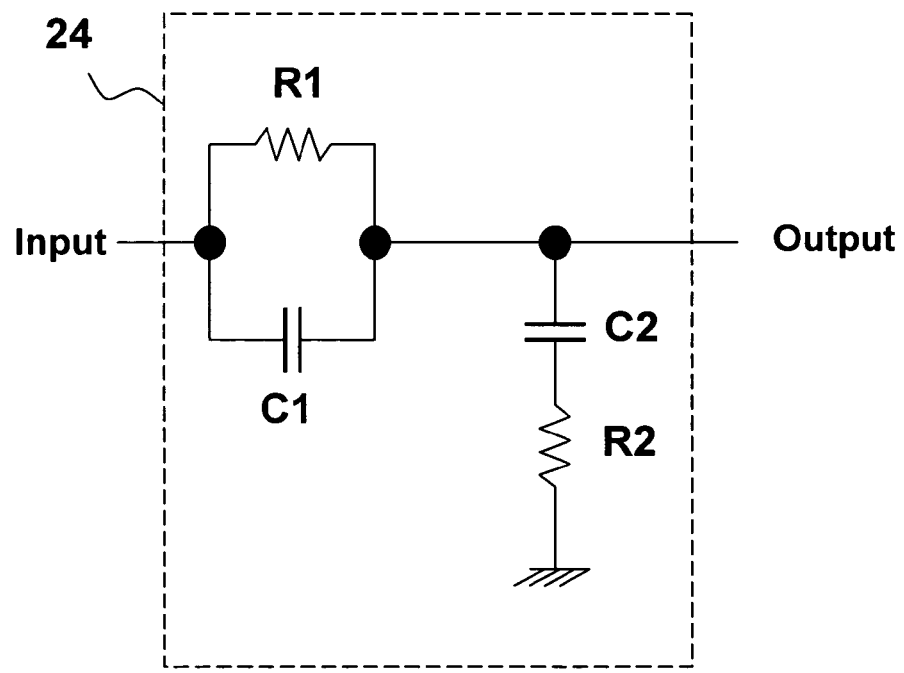

FIG. 12 shows one embodiment of the combination of high-pass and low-pass filter circuits, circuit 24. In circuit 24, the resistor R1 and the capacitor C2 constitute the first-order low-pass filter; the resistor R2 and the capacitor C1 constitute a first-order high-pass filter. By appropriate arrangement of the values of the components R1, R2, C1, and C2, a desired frequency band can be filtered out.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or the like. As another example, the present invention can be applied to converters other than buck switching regulator, such as to the boost switching regulator and inverter switching regulator. In view of the foregoing, the spirit of the present invention should cover all such and other modifications and variations, which should be interpreted to fall within the scope of the following claims and their equivalents.

What is claimed is:

1. A switching regulator eliminating beat oscillation, comprising:
a first transistor, a second transistor, and an inductor connected to a common node, wherein the first and second transistors operate to convert an input voltage to an output voltage;
a comparator comparing a voltage signal with a saw tooth wave to generate a control signal controlling at least one of the first and second transistors;
a feedback loop obtaining a feedback signal from the output voltage and generating the voltage signal according to the feedback signal; and
an inductorless filter circuit located in the feedback loop for filtering frequencies in the vicinity of a frequency of the saw tooth wave but not filtering other high frequencies; and
wherein the inductorless filter circuit includes an inductor equivalent circuit that comprising:
a first resistor, a second resistor, a third resistor, a capacitor, and a fourth resistor connected in series sequentially between the input of the inductor equivalent circuit and ground;
a first operational amplifier comparing a voltage at the input of the inductor equivalent circuit with a voltage at a node between the second and third resistors, the output of the first operational amplifier being coupled to a node between the third resistor and the capacitor; and
a second operational amplifier comparing the voltage at the node between the second and third resistors and a voltage at the node between the capacitor and the fourth resistor, the output of the first operational amplifier being coupled to a node between the first and second resistors.

2. The switching regulator of claim 1, wherein the inductorless filter circuit further includes:
a resistor coupled between an input and an output of the inductorless filter circuit, and a capacitor and the inductor equivalent circuit connected in series between the'output of the inductorless filter circuit and ground.

3. The switching regulator of claim 1, wherein the inductorless filter circuit includes a high-pass filter circuit and a low-pass filter circuit.

4. The switching regulator of claim 3, wherein the high-pass filter circuit and low-pass filter circuit are electrically connected in series or in parallel.

5. The switching regulator of claim 3, wherein the order of the high-pass filter circuit is greater than or equal to 1.

6. The switching regulator of claim 3, wherein the order of the low-pass filter circuit is greater than or equal to 1.

7. A method for eliminating beat oscillation in a switching regulator comprising:
providing a switching regulator, the switching regulator including a first transistor, a second transistor, and an inductor connected to a common node;
operating the first and second transistors to convert an input voltage to an output voltage;
obtaining a feedback signal from the output voltage, and generating a voltage signal according to the feedback signal;
comparing the voltage signal with a saw tooth wave to generate a control signal controlling at least one of the first and second transistors; and
filtering frequencies in the vicinity of a frequency of the saw tooth wave, but not filtering other high frequencies, without an inductor during the process of obtaining the feedback signal from the output voltage and generating the voltage signal according to the feedback signal and
wherein the step of filtering the frequencies without an inductor includes an inductor equivalent circuit that comprising:
a first resistor, a second resistor, a third resistor, a capacitor, and a fourth resistor connected in series sequentially between the input of the inductor equivalent circuit and ground;
a first operational amplifier comparing a voltage at the input of the inductor equivalent circuit with a voltage at a node between the second and third resistors, the output of the first operational amplifier being coupled to a node between the third resistor and the capacitor; and a second operational amplifier comparing the voltage at the node between the second and third resistors and a voltage at the node between the capacitor and the fourth resistor, the output of the first operational amplifier being coupled to a node between the first and second resistors.

8. The method of claim 7, wherein the step of filtering the frequencies without the inductor includes: providing an inductorless filter circuit, which includes: a resistor coupled between an input and an output of the inductorless filter circuit, and a capacitor and the inductor equivalent circuit connected in series between the output of the inductorless filter circuit and ground.

9. The method of claim 7, wherein the step of filtering a predetermined frequency band without an inductor includes: performing high-pass filtering and low-pass filtering.

10. The method of claim 9, wherein the order of the high-pass filtering is greater than or equal to 1.

11. The method of claim 9, wherein the order of the low-pass filtering is greater than or equal to 1.

* * * * *